(12) United States Patent
Cho (10) Patent No.: US 10,924,474 B2
(45) Date of Patent: *Feb. 16, 2021

(54) USER SECURITY AUTHENTICATION SYSTEM IN INTERNET AND METHOD THEREOF

(71) Applicant: EBAY KOREA CO., LTD., Seoul (KR)

(72) Inventor: Jun Ho Cho, Seoul (KR)

(73) Assignee: EBAY KOREA CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,558

(22) Filed: Jul. 29, 2019

(65) Prior Publication Data

US 2020/0014677 A1   Jan. 9, 2020

Related U.S. Application Data

(63) Continuation of application No. 15/109,615, filed as application No. PCT/KR2014/012663 on Dec. 22, 2014, now Pat. No. 10,404,685.

(30) Foreign Application Priority Data

Jan. 2, 2014   (KR) .................. 10-2014-0000300

(51) Int. Cl.
*H04L 9/32*         (2006.01)
*H04L 29/06*        (2006.01)
(Continued)

(52) U.S. Cl.
CPC .......... *H04L 63/083* (2013.01); *G06F 3/0482* (2013.01); *G06F 16/9535* (2019.01);
(Continued)

(58) Field of Classification Search
None
See application file for complete search history.

(56) References Cited

U.S. PATENT DOCUMENTS 10,404,685 B2    9/2019   Cho
2001/0051906 A1* 12/2001  Esposito ................ G06Q 40/00
                                                          705/35

(Continued)

FOREIGN PATENT DOCUMENTS

KR   10-2007-0018569 A   2/2007
KR   10-2008-0080064 A   9/2008
(Continued)

OTHER PUBLICATIONS

U.S. Appl. No. 15/109,615, filed Jul. 1, 2016, Issued.
(Continued)

*Primary Examiner* — William J. Goodchild
(74) *Attorney, Agent, or Firm* — Schwegman Lundberg & Woessner, P.A.

(57) ABSTRACT

Example embodiments of the present invention provides a system and method for user security authentication in an Internet environment, in which the user may generate encoded member authentication data by combining a member ID, a password, and a unique code value of a security code selection module that are selected when the user has signed up for membership to any web service provider system, thus increasing code complexity in an access stage in which the web service provider system is accessed as well as simply enhancing security.

20 Claims, 5 Drawing Sheets

(51) Int. Cl.
- *G06F 16/9535* (2019.01)
- *G06F 21/31* (2013.01)
- *G06F 21/46* (2013.01)
- *G06F 3/0482* (2013.01)

(52) U.S. Cl.
CPC .............. *G06F 21/31* (2013.01); *G06F 21/46* (2013.01); *H04L 9/3226* (2013.01); *H04L 63/04* (2013.01); *G06F 2221/2117* (2013.01)

(56) References Cited

U.S. PATENT DOCUMENTS

| | | | | |
|---|---|---|---|---|
| 2003/0046589 | A1* | 3/2003 | Gregg | H04L 63/0823 726/5 |
| 2003/0182558 | A1* | 9/2003 | Lazzaro | G07F 7/1041 713/183 |
| 2005/0188123 | A1* | 8/2005 | Chen | H04L 29/06027 710/33 |
| 2006/0090073 | A1* | 4/2006 | Steinberg | G06F 21/31 713/170 |
| 2007/0136573 | A1* | 6/2007 | Steinberg | G06F 21/43 713/155 |
| 2010/0257354 | A1* | 10/2010 | Johnston | G06F 21/6209 713/153 |
| 2016/0330190 | A1 | 11/2016 | Cho | |

FOREIGN PATENT DOCUMENTS

| | | | |
|---|---|---|---|
| KR | 10-2011-0069567 | A | 6/2011 |
| KR | 10-2013-0024388 | A | 3/2013 |
| WO | 2015/102279 | A1 | 7/2015 |

OTHER PUBLICATIONS

Applicant Initiated Interview Summary Received for U.S. Appl. No. 15/109,615 dated Apr. 20, 2018, 5 pages.
Non-Final Office Action received for U.S. Appl. No. 15/109,615, dated Jan. 30, 2018, 9 pages.
Non-Final Office Action received for U.S. Appl. No. 15/109,615, dated Sep. 20, 2018, 10 pages.
Notice of Allowance received for U.S. Appl. No. 15/109,615, dated Apr. 22, 2019, 9 pages.
Preliminary Amendment received for U.S. Appl. No. 15/109,615, filed Jul. 1, 2016, 7 pages.
Response to Non-Final Office Action filed on Feb. 21, 2019, for U.S. Appl. No. 15/109,615, dated Sep. 20, 2018, 12 pages.
Response to Non-Final Office Action filed on May 30, 2018, for U.S. Appl. No. 15/109,615, dated Jan. 30, 2018, 12 pages.
Decision of Final Rejection received for Korean Patent Application No. 10-2014-0000300, dated May 6, 2015, 5 pages (Including English Claims).
International Preliminary Report on Patentability received for PCT Application No. PCT/KR2014/012663, dated Jul. 5, 2016, 9 pages.
International Search Report received for PCT Application No. PCT/KR2014/012663, dated Apr. 1, 2015, 5 pages (Including English Translation).
Written Opinion received for PCT Application No. PCT/KR2014/012663, dated Apr. 1, 2015, 5 pages (Including English Translation).
Response to Office Action filed on Mar. 4, 2015 for Korean Patent Application No. 10-2014-0000300, dated Jan. 5, 2015, 32 pages (Including English Claims).
Response to Office Action filed on Jul. 3, 2015 for Korean Patent Application No. 10-2014-0000300, dated May 6, 2015, 29 pages (Including English Claims).
Office Action received for Korean Patent Application No. 10-2014-0000300, dated Jan. 5, 2015, 4 pages (Including English Claims).
Notice of Decision to Grant Received for Korean Patent Application No. 10-2014-0000300, dated Jul. 27, 2015, 3 pages.

* cited by examiner

USER SECURITY AUTHENTICATION SYSTEM IN INTERNET AND METHOD THEREOF

CLAIM OF PRIORITY

This application is a Continuation of U.S. application Ser. No. 15/109,615, filed on Jul. 1, 2016, which is a U.S. National Stage Filing under 35 U.S.C. 371 from International Application No. PCT/KR2014/012663, filed on 22 Dec. 2014, and published as WO 2015/102279 A1 on 9 Jul. 2015, which claims the benefit of Korean Application Serial No. 10-2014-0000300, filed on 2 Jan. 2014, which applications and publication are incorporated by reference herein in their entirety.

TECHNICAL FIELD

Example embodiments of the present invention relate in general to a system and method for user security authentication in an Internet environment and more specifically to a system and method for user security authentication in an Internet environment, in which the user may generate encoded member authentication data by combining a member ID, a password, and a unique code value of a security code selection module that are selected when the user has signed up for membership to any web service provider system, thus increasing code complexity in a stage at which the web service provider system is accessed as well as simply enhancing security.

RELATED ART

In general, the Internet is composed of computers, which are separated from and communicate to each other based on a transmission control protocol/Internet protocol (TCP/IP), and networks including the computers. A variety of information is shared between different networks over the Internet.

In the early stage, the Internet provided services such as an electronic mail, a gopher, a telnet, a file transfer protocol (FTP), which did not widely spread due to limited services that were based on text.

However, the Internet rapidly spread with development of a new Internet service technology that is called the World Wide Web (hereinafter, referred to as the web).

The web may provide various forms of information (for example, a character, an image, a video, a voice, etc.) based on a communication protocol called hypertext transfer protocol (HTTP) and a language such as hypertext markup language (HTML).

In addition, at an initial stage, the web provided hypertext that was simply associated with character information, using a hyperlink technique that allowed direct movement from one piece of information to another piece of information, but, presently, implements hypermedia that associates an image, a video, and a voice according to a request of multimedia information from a user.

Accordingly, the number of networks connected to, and using, the Internet rapidly increases, thus increasing the range and content of information included in the Internet.

In such an Internet environment, several web services that are typically provided, for example, an electronic transaction, are applied over the Internet using the above-described advantages. Furthermore, new types of web services are currently being developed.

Here, in such an Internet environment, any web service provider system operates a specific user identification (member ID and password) and authentication means to perform management and security by a user. Accordingly, in order to use the web service provider system, specific identification information is assigned to each user, and an individual authentication procedure is performed on the identification information whenever the web service provider system is accessed.

In conventional user identification and authentication in an Internet environment, in order to protect a random character input attempt through a specific program for the purpose of account takeover, a long character string is generated to increase complexity to provide protection against a security threat such as the account takeover. However, as the character string code is longer, the user has difficulty in remembering the code.

SUMMARY

Accordingly, example embodiments of the present invention are provided to substantially obviate one or more problems due to limitations and disadvantages of the related art.

Example embodiments of the present invention provides a system and method for user security authentication in an Internet environment, in which the user may generate encoded member authentication data by combining a member ID, a password, and a unique code value of a security code selection module that are selected when the user has signed up for membership to any web service provider system, thus increasing code complexity in an access stage in which the web service provider system is accessed as well as simply enhancing security.

In some example embodiments, a system for user security authentication in an Internet environment includes: a user terminal equipped with a web browser; a web server connected with the user terminal over the Internet and configured to transmit a webpage in response to an access of the user terminal, transmit a member authentication means to the webpage of the user terminal in response to a web service request, and provide a web service to the user terminal in response to reception of encoded member authentication data from the user terminal; a member authentication information DB configured to store member information of users who have signed up for membership and member authentication data for authenticating the membership to receive the web service provided by the web server; and a member authentication server configured to receive the encoded member authentication data from the user terminal through the web server, decode the encoded member authentication data, and analytically compare the decoded member authentication data with the member authentication data stored in the member authentication information DB to determine whether a corresponding user is authenticated as a member, in which the member authentication means includes a member ID, a password, and a security code selection module, the security code selection module includes a plurality of code selection display means having respective encoded unique code values and is displayed on the webpage of the user terminal, and the member authentication data transmitted from the user terminal includes data encoded by combining a member ID, a password and a unique code value of at least one code selection display means selected among the plurality of code selection display means in the security code selection module.

The security code selection module may be configured as a single-dimensional or multidimensional table, and the plurality of code selection display means may be arranged on the table to be selected by a user.

The plurality of code selection display means may include at least one of a number, a character, a figure, an image, a color, and a keyword or a combination thereof.

When the plurality of code selection display means are displayed on the webpage of the user terminal, the web server may provide a service such that the plurality of code selection display means are displayed in a random order of arrangement.

When a plurality of code selection display means selected in the security code selection module, the member authentication server may compare an order of selecting the code selection display means in the member authentication data transmitted from the user terminal and an order of selecting code selection display means in the member authentication data stored in the member authentication information DB to determine whether the user is authenticated as a member.

The web server may provide a service such that a predetermined delimiter character is additionally inserted into the member authentication data input through the member authentication means at predetermined intervals to be encoded, and the member authentication server may provide a service such that the predetermined delimiter character is additionally inserted into the member authentication data stored in the member authentication information DB at the predetermined intervals to be updated.

In other example embodiments, a method of user security authentication using a system including a web server connected with a user terminal equipped with a web browser over the Internet and configured to provide a web service and a member authentication server includes steps of: (a) requesting a web service from the web server through the user terminal; (b) transmitting a member authentication means to a webpage of the user terminal in response to the request of the web service in step (a) through the web server; (c) transmitting encoded member authentication data using the member authentication means transmitted in step (b) through the user terminal; (d) receiving the encoded member authentication data transmitted in step (c), decoding the received encoded member authentication data, and analytically comparing the decoded member authentication data with member authentication data previously stored in a separate member authentication information DB to determine whether a corresponding user is authenticated as a member, through the member authentication server; and (e) when the user is determined to be authenticated as a member in step (d), providing the web service to the user terminal through the web server, in which in step (b), the member authentication means includes a member ID, a password, and a security code selection module, and the security code selection module includes a plurality of code selection display means having respective encoded unique code values and is displayed on the webpage of the user terminal, and wherein in step (c), the member authentication data transmitted from the user terminal includes data encoded by combining a member ID, a password and a unique code value of at least one code selection display means selected among the plurality of code selection display means in the security code selection module.

The security code selection module may be configured as a single-dimensional or multidimensional table, and the plurality of code selection display means may be arranged on the table to be selected by a user.

Each of the plurality of code selection display means may include at least one of a number, a character, a figure, an image, a color, and a keyword or a combination thereof.

When the plurality of code selection display means are displayed on the webpage of the user terminal, the web server may provide a service such that the plurality of code selection display means are displayed in a random order of arrangement.

The method of claim 7, wherein when a plurality of code selection display means are selected in the user in the security code selection module of the member authentication means in step (c), the member authentication server may compare an order of selecting the code selection display means in the member authentication data transmitted from the user terminal and an order of selecting code selection display means in the member authentication data stored in the member authentication information DB to determine whether the user is authorized as a member.

The method may further include, after step (c), providing a service such that a predetermined delimiter character is additionally inserted into the member authentication data input from the member authentication means at predetermined intervals to be encoded through the web server and providing a service such that the predetermined delimiter character is additionally inserted into the member authentication data stored in the member authentication information DB at the predetermined intervals to be updated through the member authentication server.

In still other example embodiments, a computer-readable recording medium storing a program for executing the method of user security authentication in an Internet environment is provided.

The method of user security authentication in an Internet environment may be implemented as computer-readable codes on the computer-readable recording medium. The computer-readable recording medium includes all kinds of recording devices for storing data which can be thereafter read by a computer system.

Examples of the computer-readable recording medium include a read-only memory (ROM), a random-access memory (RAM), a CD-ROM, a magnetic tape, a hard disk, a floppy disk, a mobile storage device, a non-volatile memory (flash memory), and an optical data storage device.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout. As used herein, the term "and/or," includes any and all combinations of one or more of the associated listed items.

It will be understood that, although the terms "first," "second," etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, when the detailed description of the relevant known functions or configurations is determined to unnecessarily obscure the important point of the present invention, the detailed description will be omitted. Also, the terms described below are defined in consideration of the functions in the present invention, and thus may vary depending on intentions or customs of a user or operator. Accordingly, the terms will be defined based on the whole specification.

Figure 1:
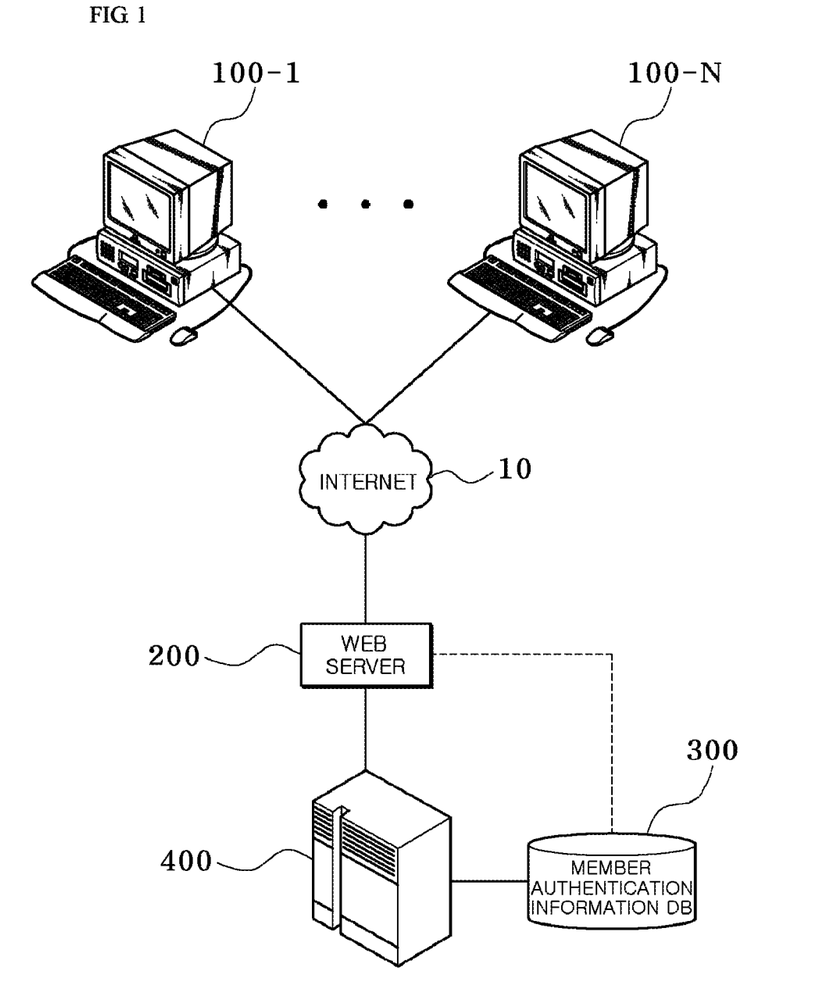
FIG. 1 is a block diagram illustrating a system for user security authentication in an Internet environment according to an embodiment of the present invention.

FIG. 1 is a block diagram illustrating a system for user security authentication in an Internet environment according to an embodiment of the present invention.

Referring to FIG. 1, a system for user security authentication in an Internet environment according to an embodiment includes at least one user terminal 100-1 to 100-N, a web server 200, a member authentication information DB 300, and a member authentication server 400.

Here, the user terminal 100-1 to 100-N is connected to the web server 200 over the Internet 10 and includes a typical web browser that is used to retrieve and display a web page, such as various hypertext markup language (HTML) documents, provided by the web server 200 on a screen.

That is, the user terminal 100-1 to 100-N includes a web browser for accessing a plurality of websites, for example, the web server 200, through the Internet 10 to search for a webpage transmitted from the web server 200, processing information provided in a corresponding website, and transmitting a corresponding document.

In general, the user terminal 100-1 to 100-N may be a computer such as a desktop personal computer (PC) and a notebook PC, but is not limited thereto. The user terminal 100-1 to 100-N may be any type of wired/wireless communication device that may access the web server 200 through the Internet 10 to use various web services.

Examples of the user terminal 100-1 to 100-N include a mobile terminal, such as a cellular phone, a personal communication service (PCS) phone, a synchronous/asynchronous International Mobile Telecommunication-2000 (IMT-2000) phone, and so on, which can communicate through the wireless Internet or portable Internet, and may also refer to all wired/wireless home/communication devices having a user interface for accessing the web server 200, such as a palm personal computer (PC), a personal digital assistant (PDA), a smartphone, a wireless application protocol (WAP) phone, a mobile playstation, a PDA phone, a digital multimedia broadcasting phone having a communication function, a tablet PC, an iPad and so on.

The Internet 10 refers to an open global computer network structure that can provide several services in the TCP/IP protocol and its upper layer, that is, a hypertext transfer protocol (HTTP), Telnet, file transfer protocol (FTP), domain name system (DNS), simple mail transfer protocol (SMTP), simple network management protocol (SNMP), network file service (NFS), network information service (NIS), or the like, and provides an environment in which any user of the user terminal 100-1 to 100-N may access the web server 200 that is described below. The Internet 10 may be a wired or wireless network, or a core network integrated with a wired public network, a wireless mobile communication network, or a portable Internet network.

The web server 200 functions to connect the user terminal 100-1 to 100-N with an administration server (not shown) that is provided to any web service provider system over the Internet 10 and provide various web services of the administration server provided in the web service provider system through a certain web page. The web server 200 may perform the same function as that of the administration server provided in the web service provider system.

In particular, the web server 200 is connected with the user terminal 100-1 to 100-N over the Internet 10 and configured to transmit a webpage in response to an access of the user terminal 100-1 to 100-N, transmit a member authentication means to the webpage of the user terminal 100-1 to 100-N in response to a web service request, and provide a web service to the user terminal 100-1 to 100-N in response to reception of encoded member authentication data from the user terminal 100-1 to 100-N.

Figure 3:
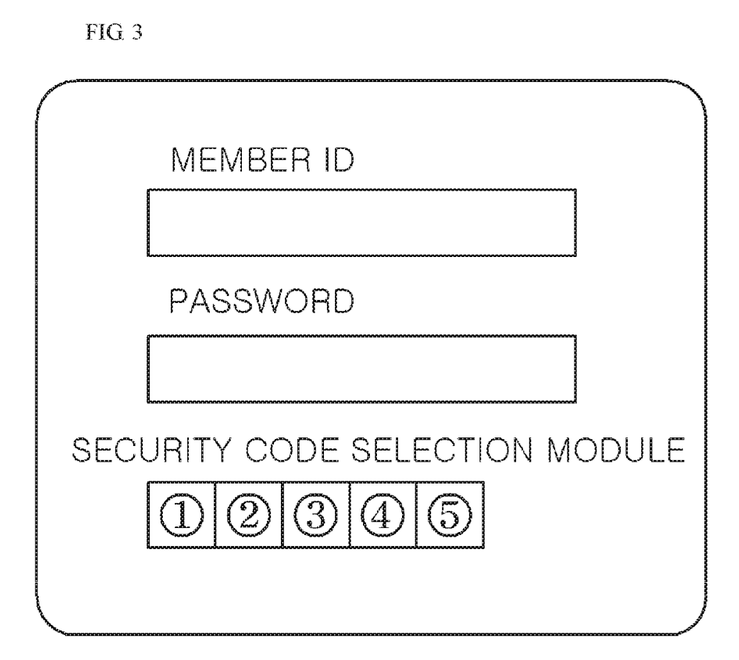
FIG. 3 is a view showing a member login screen for accessing a web service provider system that is applied in an embodiment of the present invention.
Figure 4:
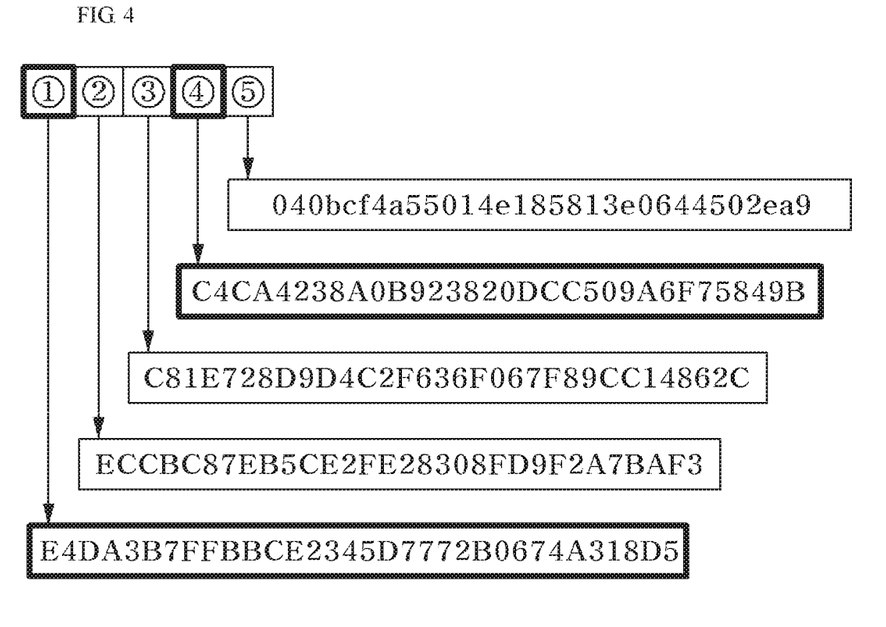
FIGS. 4 to 7 are views showing various examples of a code selection display means in a security code selection module that is applied to an embodiment of the present invention.
Figure 5:
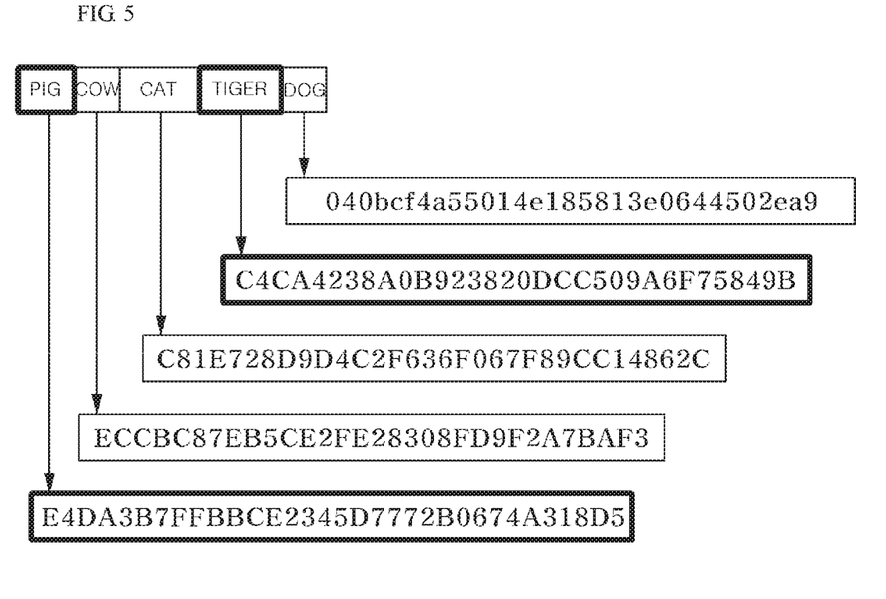
Figure 6:
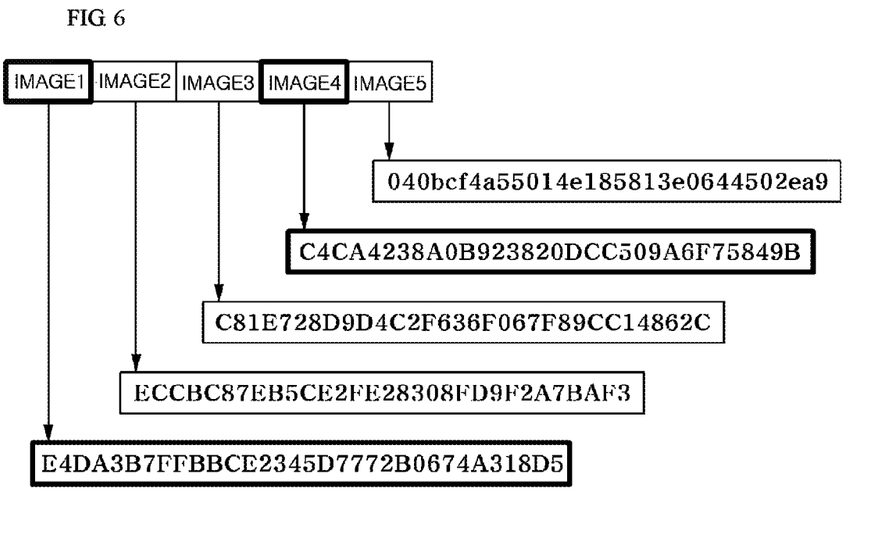
Figure 7:
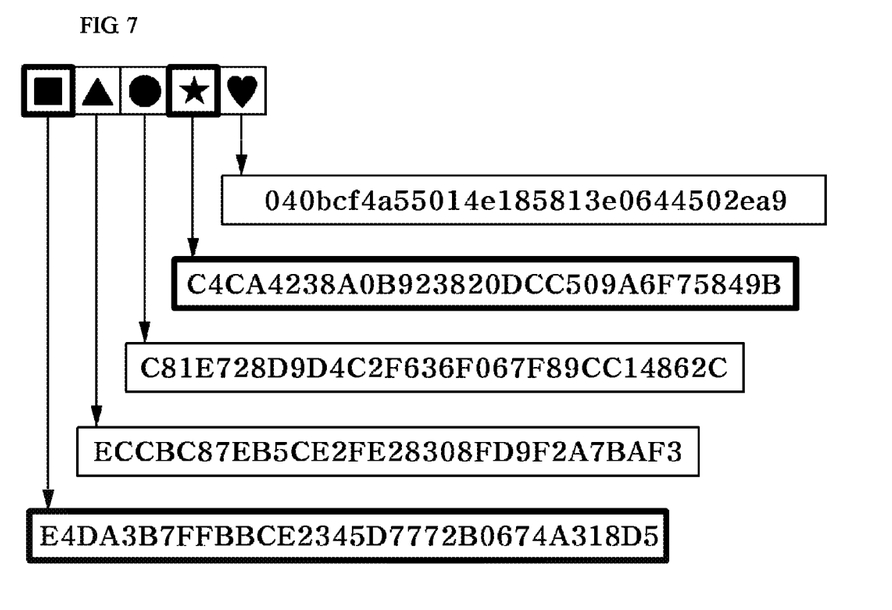

In this case, the member authentication means may include, for example, a member ID, a password, and a security code selection module, as shown in FIG. 3, and the security code selection module may include a plurality of code selection display means having respective encoded unique code values and is displayed on the webpage of the user terminal 100-1 to 100-N.

If the plurality of code selection display means are displayed on the webpage of the user terminal 100-1 to 100-N, the web server 200 may provide a service such that the plurality of code selection display means are displayed in a random order of arrangement.

The member authentication data transmitted from the user terminal 100-1 to 100-N includes data encoded by combining a member ID, a password and a unique code value of at least one code selection display means selected among the plurality of code selection display means in the security code selection module.

The security code selection module may be configured as a single-dimensional (one-dimensional) or multidimensional (two, three, or four-dimensional) table, and the plurality of code selection display means may be arranged on the table to be selected by a user.

The plurality of code selection display means may include at least one of a number, a character, a figure, an image, a color, and a keyword or a combination thereof (see FIGS. 4 to 7).

The member authentication information DB 300 functions to build a database including member information of users who have signed up for membership and member authentication data for authenticating the membership for each member to receive the web service provided by the web server 200.

The member authentication information DB 300 may be implemented for the purpose of the present invention, using a relational database management system (RDBMS), such as Oracle, Infomix, Sybase, and DB2, and an object-oriented database management system (OODBMS), such as Gemstone, Orion, and O2, and configured to have a field suitable for accomplishing its function.

The member authentication server 400 is connected with the web server 200 through a wired/wireless communication means and functions to receive the encoded member authentication data from the user terminal 100-1 to 100-N through the web server 200, decode the received encoded member authentication data, and analytically compare the decoded member authentication data with the member authentication data stored in the member authentication information DB 300 to determine whether a corresponding user is authenticated as a member.

When a plurality of code selection display means are selected by the user in the security code selection module of the member authentication means, the member authentication server 400 may compare an order of selecting the code selection display means in the member authentication data transmitted from the user terminal 100-1 to 100-N and an order of selecting code selection display means in the member authentication data stored in the member authentication information DB 300 to determine whether the user is authenticated as a member.

Additionally, the web server 200 may provide a service such that a predetermined delimiter character (for example, a special character) is additionally inserted into the member authentication data input through the member authentication means at predetermined intervals to be encoded, and the member authentication server 400 may provide a service such that the predetermined delimiter character is additionally inserted into the member authentication data previously stored in the member authentication information DB 300 at the predetermined intervals to be updated.

A method of user security authentication in an Internet environment according to an embodiment of the present invention will be described in detail below.

Figure 2:
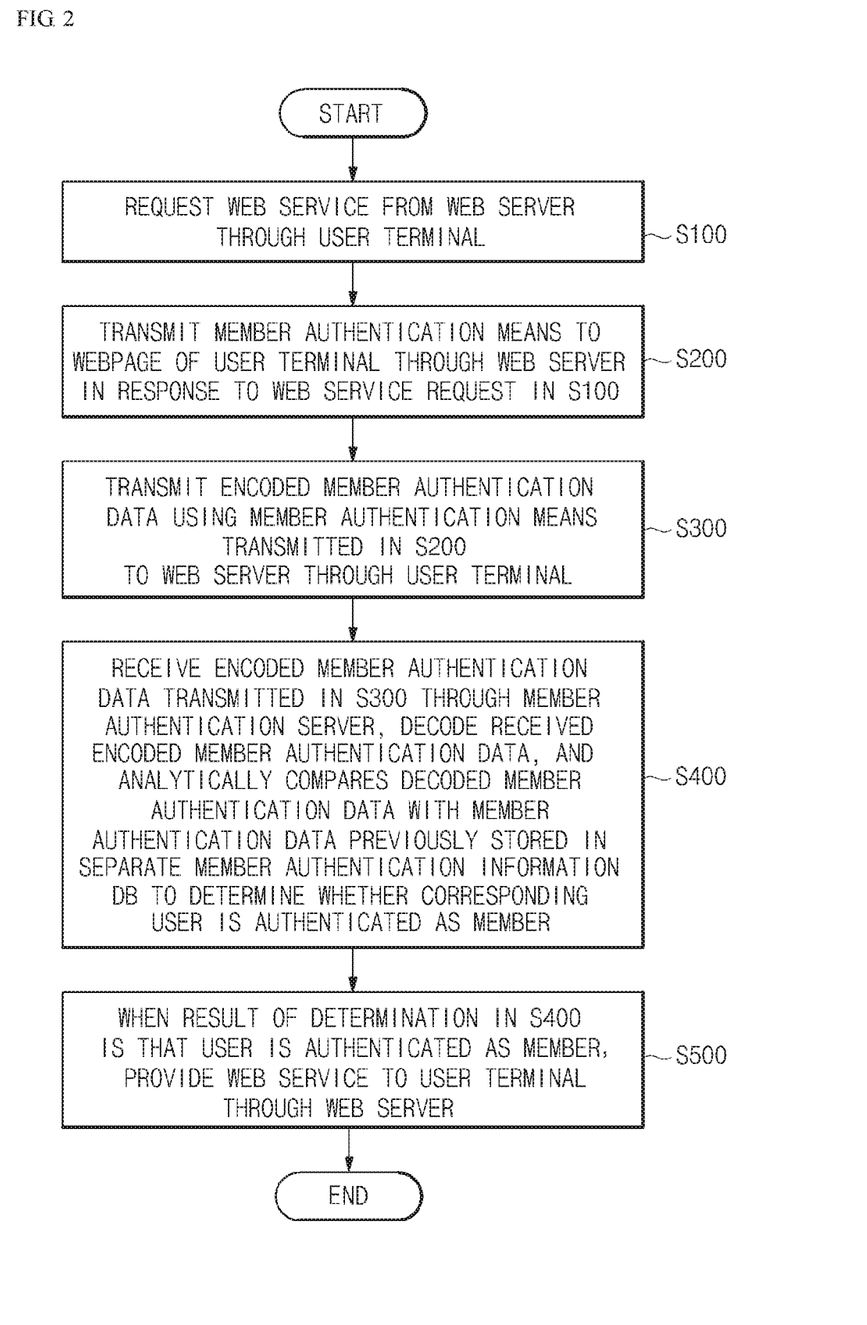
FIG. 2 is a flowchart illustrating a method of user security authentication in an Internet environment according to an embodiment of the present invention.

FIG. 2 is a flowchart illustrating a method of user security authentication in an Internet environment according to an embodiment of the present invention, FIG. 3 is a view showing a member login screen for accessing a web service provider system that is applied in an embodiment of the present invention, and FIGS. 4 to 7 are views showing various examples of a code selection display means in a security code selection module that is applied to an embodiment of the present invention.

Referring to FIGS. 1 to 7, in a method of user security authentication in an Internet environment according to an embodiment of the present invention, first, a user accesses a specific webpage provided by the web server 200 of any web service provider system through the user terminal 100-1 to 100-N and signs up for membership.

In this case, the user selects at least one of a plurality of code selection display means of the security code selection module that is provided by the web server 200 and allows the selected code selection display means to be stored in the member authentication information DB 300 in addition to a member ID and a password.

Next, when the user requests a web service from the web server 200 through the user terminal 100-1 to 100-N (S100), the web server 200 transmits a member authentication means to a webpage of the user terminal 100-1 to 100-N in response to a web service request in S100 (S200).

In this case, the member authentication means may include a member ID, a password, and a security code selection module, as shown in FIG. 3, and the security code selection module may include a plurality of code selection display means having respective encoded unique code values and is displayed on the web page of the user terminal 100-1 to 100-N (see FIGS. 4 to 7).

In addition, the security code selection module may be configured as a single-dimensional (one-dimensional) or multidimensional (two, three, or four-dimensional) table, and the plurality of code selection display means may be arranged on the table to be selected by a user.

Further, the plurality of code selection display means may include at least one of a number, a character, a figure, an image, a color, and a keyword or a combination thereof as shown in FIGS. 4 to 7.

When the plurality of code selection display means are displayed on the webpage of the user terminal 100-1 to 100-N, the web server 200 may provide a service such that the plurality of code selection display means are displayed in a random order of arrangement.

Subsequently, the user terminal 100-1 to 100-N transmits encoded member authentication data using the member authentication means transmitted in S200 to the web server 200 (S300).

In this case, the member authentication data transmitted from the user terminal 100-1 to 100-N includes data encoded by combining a member ID, a password and a unique code value of at least one code selection display means selected among the plurality of code selection display means in the security code selection module.

Next, the member authentication server 400 receives the encoded member authentication data transmitted in S300, decodes the received encoded member authentication data, and analytically compares the decoded member authentication data with member authentication data previously stored in a separate member authentication information DB 300 to determine whether a corresponding user is authenticated as a member (S400).

When a plurality of code selection display means are selected by the user in the security code selection module of the member authentication means in S300, the member authentication server 400 may compare an order of selecting the code selection display means in the member authentication data transmitted from the user terminal 100-1 to 100-N and an order of selecting code selection display means in the member authentication data stored in the member authentication information DB 300 to determine whether the user is authenticated as a member.

That is, when a result of the comparison is that the order of selecting the code selection display means transmitted from the user terminal 100-1 to 100-N is the same as the order of selecting the code selection display means stored in the member authentication information DB 300, the member authentication server 400 authenticates the user as a member.

Subsequently, when a result of the determination in S400 is that the user is authenticated as a member because the decoded member authentication data is the same as the member authentication data previously stored in the member authentication information DB 300, the web server 200 provides the web service to the user terminal 100-1 to 100-N (S500).

Additionally, after S300, the method may further include providing, by the web server 200, a service such that a predetermined delimiter character (for example, a special character) is additionally inserted into the member authentication data input through the member authentication means at predetermined intervals to be encoded. Preferably, the member authentication server 400 may provide a service such that the predetermined delimiter character is additionally inserted into the member authentication data stored in the member authentication information DB 300 at the predetermined intervals to be updated to determine whether the member is authenticated as a member.

The method of user security authentication in an Internet environment according to an embodiment of the present invention can also be implemented as computer-readable codes on a computer-readable recording medium. The computer-readable recording medium is any data storage medium that can store data which can be thereafter read by a computer system.

Examples of the computer-readable recording medium include a read-only memory (ROM), a random-access memory (RAM), a CD-ROM, a magnetic tape, a hard disk, a floppy disk, a mobile storage device, a non-volatile memory (flash memory), and an optical data storage device.

The computer-readable recording medium can also be distributed over computer systems connected through a computer communication network so that the computer-readable code is stored and executed in a distributed fashion.

With the system and method for user security authentication in an Internet environment according to an embodiment of the present invention, a user can generate encoded member authentication data by combining a member ID, a password, and a unique code value of a security code selection module that are selected when the user has signed up for membership to any web service provider system, thus increasing code complexity in an access stage at which the web service provider system is accessed as well as simply enhancing security.

While the preferred embodiments of the system and method for user security authentication in an Internet environment are described, the present invention is not limited thereto, various modifications may be made therein, and the appended claims are intended to cover all such modifications which may fall within the spirit and scope of the invention.

What is claimed is:

1. A system for providing security authentication in an Internet environment, the system comprising:
   one or more servers having one or more processing circuits and a non-transitory storage medium, the non-transitory storage medium having computer code that is executable by the one or more processing circuits to cause the one or more servers to perform operations comprising:
   generating, for display on a user device, a webpage for receiving user authentication information from a user, the user authentication information comprising user credentials and a selection of at least one of a plurality of displayed code objects, the plurality of displayed code objects each having a unique code value comprising at least two characters;
   receiving, from the user device, the user authentication information comprising data that combines the user credentials and the unique code value of the selected at least one of the plurality of displayed code objects;
   determining whether the data of the received user authentication information corresponds to previously stored member authentication data for the user, the previously stored member authentication data comprising a preselected at least one of the plurality of displayed code objects; and
   enabling the user device to access a web service in response to determining that the data of the received user authentication information corresponds to the previously stored member authentication data for the user.

2. The system of claim 1, wherein the webpage includes a plurality of fields that are currently displayed, a first field of the plurality of fields configured to receive a member ID, a second field of the plurality of fields configured to receive a password, and a third of the plurality of fields configured to present the plurality of displayed code objects, and wherein the data that combines the user credentials and the unique code value comprises data encoded by combining the member ID in the first field, the password in the second field, and the unique code value of the selected at least one of the plurality of displayed code objects in the third field.

3. The system of claim 1, wherein the operations further comprise:
   decoding the received data that combines the user credentials and the unique code value; and
   analytically comparing the decoded data with the previously stored member authentication data for the user.

4. The system of claim 1, wherein the unique code values of the displayed code objects do not provide an indication of a rendered indicator of at least one code selection display object.

5. The system of claim 1, wherein the at least one of the plurality of displayed code objects includes at least one of a number, a character, a figure, an image, a color, or a keyword or a combination thereof.

6. The system of claim 1, wherein the operations further comprise providing, based on the at least one of the plurality of displayed code objects being displayed the webpage of the user device, a service to display the plurality of displayed code objects in a random order of arrangement.

7. The system of claim 1, wherein the operations further comprise comparing, based on receiving the data, a sequence of selecting at least two displayed code objects and a previously stored sequence of displayed code objects to determine whether the user is authenticated as a member.

8. The system of claim 1, wherein the operations further comprise:
   inserting, at predetermined intervals, a predetermined delimiter character into received member authentication data used to generate encoded member authentication data; and
   inserting the predetermined delimiter character into the stored member authentication data at the predetermined intervals.

9. A method comprising:
    generating, by one or more processors, for display on a user device, a webpage for receiving user authentication information from a user, the user authentication information comprising user credentials and a selection of at least one of a plurality of displayed code objects, the plurality of displayed code objects each having a unique code value comprising at least two characters;
    receiving, from the user device, the user authentication information comprising data that combines the user credentials and the unique code value of the selected at least one of the plurality of displayed code objects;
    determining whether the data of the received user authentication information corresponds to previously stored member authentication data for the user, the previously stored member authentication data comprising a preselected at least one of the plurality of displayed code objects; and
    enabling the user device to access a web service in response to determining that the data of the received user authentication information corresponds to the previously stored member authentication data for the user.

10. The method of claim 9, wherein the webpage includes a plurality of fields that are currently displayed, a first field of the plurality of fields configured to receive a member ID, a second field of the plurality of fields configured to receive a password, and a third of the plurality of fields configured to present the plurality of displayed code objects, and wherein the data that combines the user credentials and the unique code value comprises data encoded by combining the member ID in the first field, the password in the second field, and the unique code value of the selected at least one of the plurality of displayed code objects in the third field.

11. The method of claim 9, further comprising:
    decoding the received data that combines the user credentials and the unique code value; and
    analytically comparing the decoded data with the previously stored member authentication data for the user.

12. The method of claim 9, wherein the unique code values of the displayed code objects do not provide an indication of a rendered indicator of at least one code selection display object.

13. The method of claim 9, wherein the at least one of the plurality of displayed code objects includes at least one of a number, a character, a figure, an image, a color, or a keyword or a combination thereof.

14. The method of claim 9, further comprising providing, based on the at least one of the plurality of displayed code objects being displayed the webpage of the user device, a service to display the plurality of displayed code objects in a random order of arrangement.

15. The method of claim 9, further comprising comparing, based on receiving the data, a sequence of selecting at least two displayed code objects and a previously stored sequence of displayed code objects to determine whether the user is authenticated as a member.

16. The method of claim 9, further comprising:
    inserting, at predetermined intervals, a predetermined delimiter character into received member authentication data used to generate encoded member authentication data; and
    inserting the predetermined delimiter character into the stored member authentication data at the predetermined intervals.

17. A non-transitory computer-readable storage medium storing a set of computer executable instructions, the instructions, when executed by one or more processors of computer, cause the computer to perform operations comprising:
    generating, for display on a user device, a webpage for receiving user authentication information from a user, the user authentication information comprising user credentials and a selection of at least one of a plurality of displayed code objects, the plurality of displayed code objects each having a unique code value comprising at least two characters;
    receiving, from the user device, the user authentication information comprising data that combines the user credentials and the unique code value of the selected at least one of the plurality of displayed code objects;
    determining whether the data of the received user authentication information corresponds to previously stored member authentication data for the user, the previously stored member authentication data comprising a preselected at least one of the plurality of displayed code objects; and
    enabling the user device to access a web service in response to determining that the data of the received user authentication information corresponds to the previously stored member authentication data for the user.

18. The non-transitory computer-readable storage medium of claim 17, wherein the webpage includes a plurality of fields that are currently displayed, a first field of the plurality of fields configured to receive a member ID, a second field of the plurality of fields configured to receive a password, and a third of the plurality of fields configured to present the plurality of displayed code objects, and wherein the data that combines the user credentials and the unique code value comprises data encoded by combining the member ID in the first field, the password in the second field, and the unique code value of the selected at least one of the plurality of displayed code objects in the third field.

19. The non-transitory computer-readable storage medium of claim 17, wherein the operations further comprise:
    decoding the received data that combines the user credentials and the unique code value; and
    analytically comparing the decoded data with the previously stored member authentication data for the user.

20. The non-transitory computer-readable storage medium of claim 17, wherein the unique code values of the displayed code objects do not provide an indication of a rendered indicator of at least one code selection display object.

* * * * *